United States Patent
McDonald (10) Patent No.: US 6,314,514 B1
(45) Date of Patent: Nov. 6, 2001

(54) METHOD AND APPARATUS FOR CORRECTING AN INTERNAL CALL/RETURN STACK IN A MICROPROCESSOR THAT SPECULATIVELY EXECUTES CALL AND RETURN INSTRUCTIONS

(75) Inventor: Thomas C. McDonald, Austin, TX (US)

(73) Assignee: IP-First, LLC, Fremont, CA (US)

( * ) Notice: Subject to any disclaimer, the term of this patent is extended or adjusted under 35 U.S.C. 154(b) by 0 days.

(21) Appl. No.: 09/271,591

(22) Filed: Mar. 18, 1999

(51) Int. Cl.[7] ................ G06F 9/42; G06F 9/38; G06F 9/32
(52) U.S. Cl. .......... 712/239; 712/242; 712/243; 712/245; 712/241; 712/211; 711/132
(58) Field of Search ............ 712/23, 208, 211, 712/213, 233, 234, 237, 238, 239, 240, 228, 229, 242, 243, 202, 221, 248, 245; 717/4, 1; 714/35, 36, 38; 711/132

(56) References Cited

U.S. PATENT DOCUMENTS

| | | | |
|---|---|---|---|
| 5,313,634 | * | 5/1994 | Eickemeyer ............ 712/240 |
| 5,706,491 | * | 1/1998 | McMahan ............... 712/234 |
| 5,828,901 | * | 10/1998 | O'Toole et al. .......... 710/22 |
| 5,832,289 | * | 11/1998 | Shaw et al. .............. 712/30 |
| 5,850,543 | * | 12/1998 | Shiell et al. ............. 712/238 |
| 5,864,707 | | 1/1999 | Tran ....................... 712/23 |
| 5,961,629 | * | 10/1999 | Nguyen et al. .......... 712/23 |

* cited by examiner

Primary Examiner—Daniel H. Pan
(74) Attorney, Agent, or Firm—E. Alan Davis; James W. Huffman (57) ABSTRACT

An apparatus and method for correcting a call/return stack internal to a microprocessor is provided. In the case of a call, the microprocessor pushes the return address onto the internal call/return stack and in the case of a return, the microprocessor pops the return address from the internal call/return stack into the instruction register. However, prior to speculative execution of the call or return, the correction apparatus stores correction information to enable correction of the internal call/return stack. If the conditional branch instruction was mispredicted, the correction apparatus corrects the internal call/return stack based on the correction information previously stored. The correction information is stored in stack memories so that corrections can be made in the reverse order of which the incorrect modifications to the internal call/return stack were made. This enables correction of the internal call/return stack even if multiple call or return instructions have been speculatively executed prior to resolution of the conditional branch.

38 Claims, 6 Drawing Sheets

METHOD AND APPARATUS FOR CORRECTING AN INTERNAL CALL/ RETURN STACK IN A MICROPROCESSOR THAT SPECULATIVELY EXECUTES CALL AND RETURN INSTRUCTIONS

BACKGROUND OF THE INVENTION

1. Field of the Invention

This invention relates in general to the field of microprocessors, and more particularly to branch prediction and internal call/return stacks.

2. Description of the Related Art

Computer programs typically comprise a main program or procedure that calls other procedures, also commonly referred to as subroutines or functions. Each procedure is typically located in memory, referenced by a specific memory address. Consequently, microprocessors typically include in their instruction sets an instruction to call a procedure and an instruction to return from a procedure. When a microprocessor encounters a call instruction, the microprocessor transfers control to the procedure whose address the call instruction specifies. Once the called procedure has completed it executes a return instruction and the microprocessor returns control back to the calling procedure at the instruction following the call instruction in the calling procedure.

In x86 architecture microprocessors, the call and return instructions are the CALL (Call Procedure) and RET (Return from Procedure) instructions. These instructions are specified on pages 25–50 to 25–56 and 25–271 to 25–274, respectively, of the Intel Pentium Processor Family Developer's Manual Volume 3: Architecture and Programming Manual, 1995, which is hereby incorporated by reference.

The x86 architecture CALL instruction saves the address of the instruction following the CALL instruction in the main memory of the system. The RET instruction retrieves the address, referred to as the return address, from main memory and transfers control to the calling procedure at the return address.

The CALL and RET instructions implicitly use a portion of the main memory called the "stack" to save the return address. A stack is a last-in-first-out memory. The "top" of the main memory stack in an x86 architecture processor is pointed to by a Stack Pointer (SP). A CALL instruction "pushes" the return address onto the stack. That is, the CALL decrements the SP by the size of the return address and then stores the return address in main memory at the address specified by the updated SP value. Conversely, a RET instruction "pops" the return address off the stack, places the return address into the Instruction Pointer (IP) register of the microprocessor, and increments the SP by the size of the return address. That is, the RET instruction retrieves the return address from memory at the address specified by the SP register and then increments the value of the SP.

Modern microprocessors operate on several instructions at the same time, within different blocks or pipeline stages of the microprocessor. Hennessy and Patterson define pipelining as, "an implementation technique whereby multiple instructions are overlapped in execution." *Computer Architecture: A Quantitative Approach,* $2^{nd}$ edition, by John L. Hennessy and David A. Patterson, Morgan Kaufmann Publishers, San Francisco, Calif., 1996. The authors go on to provide the following excellent illustration of pipelining:

A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe—instructions enter at one end, progress through the stages, and exit at the other end, just as cars would in an assembly line.

Thus, as the microprocessor fetches instructions it introduces them into one end of the pipeline. The instructions proceed through pipeline stages within the microprocessor until they complete execution.

In most systems, the time required for microprocessor accesses to main memory is much greater than the clock cycle time of the microprocessor, typically by at least an order of magnitude. Thus, when the microprocessor accesses main memory to push or pop a return address, it consumes much valuable time.

Furthermore, the stage that decodes the instructions is near the beginning of the pipeline, whereas the stage that performs memory accesses is typically near the end of the pipeline. This situation creates stalls or holes in the pipeline. These stalls are analogous to the assembly line where an early stage knows the next step is to add a certain part to the car, but the part is not available until a much later stage in the pipeline. Thus, the car must be passed down multiple stages without any useful work being done on the car until it reaches the stage with the part.

To overcome these problems, some modern x86 processors utilize a call/return stack internal to the processor to substantially parallel the stack in main memory. For example, the Advanced Micro Devices AMD-K6 processor utilizes an internal call/return stack as noted on page 7 of Chapter 2 and page 54 of Chapter 5 of the AMD-K6 MMX (TM) Enhanced Processor X86 Code Optimization Application Note issued August 1997, Publication #21828, Rev:A, Amendment/0.

When a microprocessor with an internal call/return stack executes a CALL instruction, it pushes the return address onto the internal call/return stack in addition to the main memory stack. Conversely, when a RET instruction is executed, the processor pops the return address off the internal call/return stack into the IP register while the return address is also being popped from the main memory stack so that the two values may be compared to verify that the return address from the internal call/return stack is correct. While the return address is being popped from the main memory stack, the microprocessor proceeds on fetching instructions from the address in the IP register and updating the IP register.

The internal call/return stack enables the processor to continue processing instructions in the pipeline while waiting for the return address to be fetched from the main memory stack. If the internal call/return stack return address is not correct, then the pipeline is flushed of all instructions processed after the incorrect return. Thus, the more consistent the internal call/return stack is kept with the main memory call/return stack the more effective the internal call/return stack becomes.

One instance where the internal and main memory call/return stacks may become inconsistent is when a call or return instruction is speculatively executed after a predicted conditional branch instruction. A conditional branch instruction examines a condition specified in the instruction, such as determining whether a parameter is equal to zero. The instruction branches to a specified target address if the condition is true, but executes the next sequential instruction if the condition if false. An example of a conditional branch instruction is the Jump if Condition is Met (JCC) instruction in x86 processors as specified on pages 25–190 to 25–192 of the Intel Pentium Processor Family Developer's Manual.

Typically, processors predict whether the conditional branch will be taken in order to avoid stalling the pipeline. That is, the processor predicts the outcome of the conditional branch and continues fetching and executing instructions based on the prediction. When the true outcome of the conditional branch is resolved later in the pipeline, if the prediction turns out to be incorrect, then the pipeline must be flushed of all instructions speculatively executed after the conditional branch instruction. This includes any call or return instructions the processor speculatively executed after the conditional branch instruction.

However, the situation described may cause an inconsistency between the internal and main memory call/return stacks. For example, suppose the processor predicts the outcome of a JCC instruction. Then, before resolving the JCC, the processor speculatively executes a CALL instruction, thereby pushing a return address onto the internal call/return stack. Next, the processor determines that it mispredicted the JCC and incorrectly executed the CALL. The processor has not pushed the return address onto the main memory call/return stack and will not. Consequently, the internal call/return stack is inconsistent with the main memory call/return stack because the return address has already been pushed onto the internal call/return stack. The condition will likely cause a pipeline flush to occur when the processor executes the next return instruction, as described above, due to the inconsistency between the internal call/return stack and the main memory call/return stack.

This problem is further exacerbated by the fact that the microprocessor may speculatively execute multiple call and/or return instructions before the conditional branch instruction is resolved. This is particularly likely in modern microprocessors that typically have deep pipelines.

Therefore, what is needed is an apparatus and method that corrects the internal call/return stack when the microprocessor incorrectly speculatively executes one or more call and return instructions.

SUMMARY

To address the above-detailed deficiencies, it is an object of the present invention to provide a method and apparatus for improving the consistency between an internal call/return stack of a microprocessor and a call/return stack in main memory.

Accordingly, in the attainment of the aforementioned object, it is a feature of the present invention to provide a correction apparatus within a microprocessor having an internal call/return stack that speculatively executes call and return instructions. The correction apparatus includes first and second memories and control logic coupled to the internal call/return stack and to the first and second memories. The control logic is configured to store correction information into the first and second memories in response to a decode of one or more call or return instructions. The control logic is further configured to correct the internal call/return stack from the correction information in response to a determination that the one or more call or return instructions was speculatively executed incorrectly.

An advantage of the present invention is that it keeps the internal and external call/return stacks consistent even if a conditional branch instruction is incorrectly predicted, thereby alleviating the need to perform time consuming pipeline flushes and consequently improving the performance of the microprocessor. Another advantage of the present invention is that it enables correction of the internal call/return stack even if multiple call or return instructions have been speculatively executed prior to resolution of a mispredicted conditional branch instruction.

In another aspect, it is a feature of the present invention to provide a microprocessor that speculatively executes call and return instructions. The microprocessor includes an internal call/return stack, first and second memories and control logic coupled to the internal call/return stack and to the first and second memories. The control logic is configured to store correction information into the first and second memories in response to a decode of one or more call or return instructions. The control logic is further configured to correct the internal call/return stack from the correction information in response to a determination that the one or more call or return instructions was speculatively executed incorrectly.

In yet another aspect, it is a feature of the present invention to provide a method for correcting an internal call/return stack in a microprocessor that speculatively executes call and return instructions. The method includes decoding a call or return instruction and storing correction information into first and second memories in response to decoding the call or return instruction. The method further includes speculatively executing the call or return instruction after storing the instruction and determining if the instruction was speculatively executed incorrectly. The method further includes correcting the internal call/return stack from the correction information if the call or return instruction was speculatively executed incorrectly.

BRIEF DESCRIPTION OF THE DRAWINGS

These and other objects, features, and advantages of the present invention will become better understood with regard to the following description, and accompanying drawings where.

DETAILED DESCRIPTION

Figure 1:
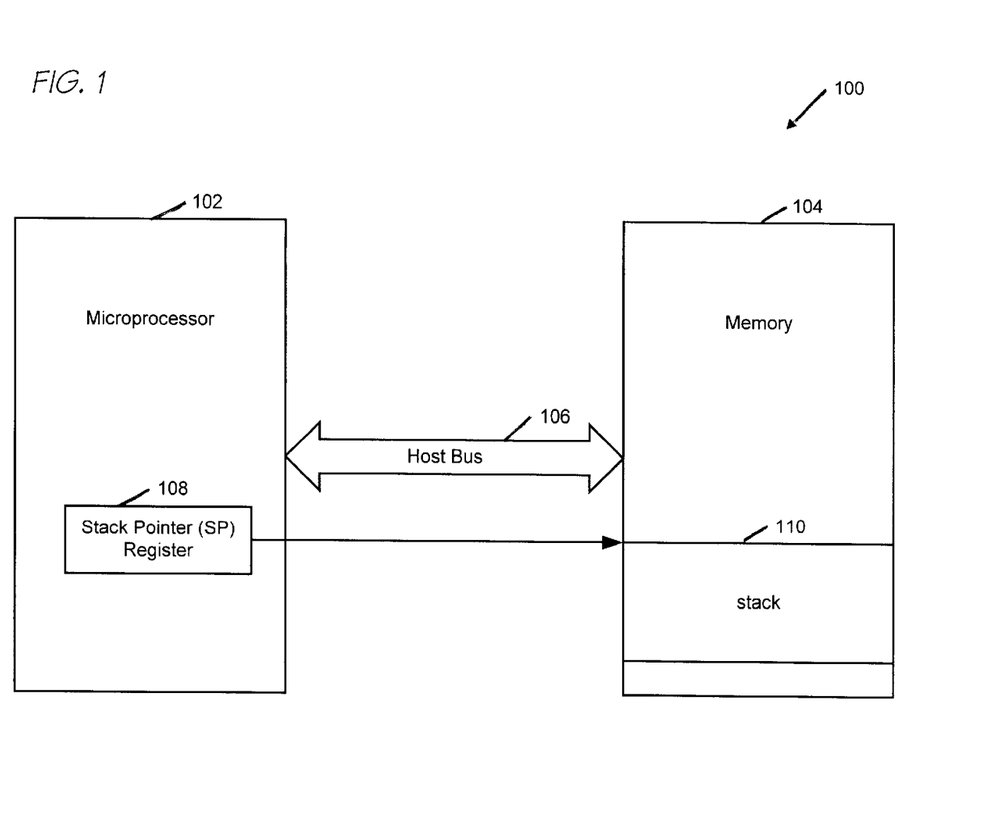
FIG. 1 is a block diagram of portions of a computer system including a microprocessor according to the present invention.

Referring to FIG. 1, a block diagram of portions of a computer system 100 including a microprocessor 102 according to the present invention are shown. The computer system 100 includes microprocessor 102 connected to a memory 104 via a host bus 106. The microprocessor 102 includes a stack pointer (SP) register 108. The SP register 108 holds an address of a location in the memory 104 that is the top of a stack 110. The microprocessor 102 uses the stack 110, among other things, to store the return addresses of call instructions and to retrieve the return addresses in order to execute return instructions.

In operation, the microprocessor 102 executes instructions, including call, return and conditional branch instructions, retrieved from the memory 104. Software programs executing on the microprocessor 102 create the stack 110 by loading the SP register 108 with an address of the memory 104.

Figure 2:
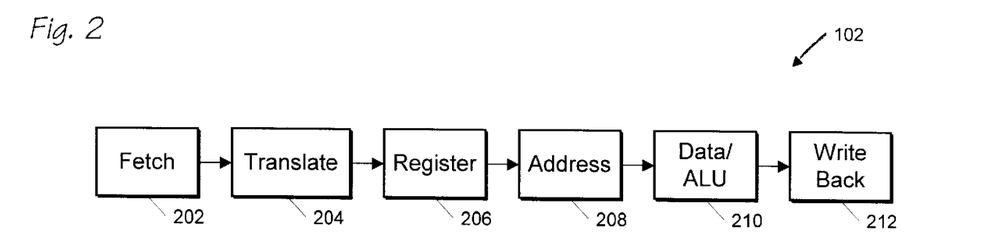
FIG. 2 is a block diagram illustrating processing stages within a pipeline microprocessor according to the present invention.

Referring now to FIG. 2, pipeline stages of the microprocessor 102 are shown. Although the microprocessor 102 comprises a six-stage pipeline, the present invention is not limited to a pipeline of any certain number of stages and is applicable to any number of pipeline stages. The microprocessor 102 includes Fetch 202, Translate 204, Register 206, Address 208, Data/ALU 210 and Write Back 212 stages. The Fetch stage 202 fetches instructions that are to be executed by the microprocessor 102, such as call, return or conditional branch instructions. The Translate stage 204 translates or decodes the fetched instructions into a sequence of micro operations that may be executed by the microprocessor 102. The Translate stage 204 detects that a call or return instruction has been decoded so that correction information may be saved by the correction apparatus of the present invention described below.

The Register stage 206 retrieves operands specified by the micro operations from a register file for use by later stages in the pipeline. The Address stage 208 calculates memory addresses specified by micro operations, to be used in data storage and retrieval operations to and from the memory 104 of FIG. 1.

The Data/ALU stage 210 either performs ALU operations on data retrieved from the register file, or reads/writes data from/to memory 104 using the memory address calculated in the Address stage 208. The Data/ALU stage 210 performs, among other things, comparisons or other operations necessary to determine whether the condition of a conditional branch instruction is met. That is, conditional branch instructions are resolved in the Data/ALU stage 210. Thus, if a call or return instruction reaches the Data/ALU stage 210, then it is no longer speculative. This is because the conditional branch would have to have been resolved for the call or return to reach the Data/ALU stage 210. The Write Back stage 212 writes the result of a data read operation, or an ALU operation, to the register file or to a location in memory 104.

In operation, instructions are fetched by the Fetch stage 202, translated into micro operations by the Translate stage 204, proceeding through stages 206–212 for execution. The pipeline stages of the microprocessor 102 are typical of the type of microprocessor in which the present invention may be used.

Figure 3:
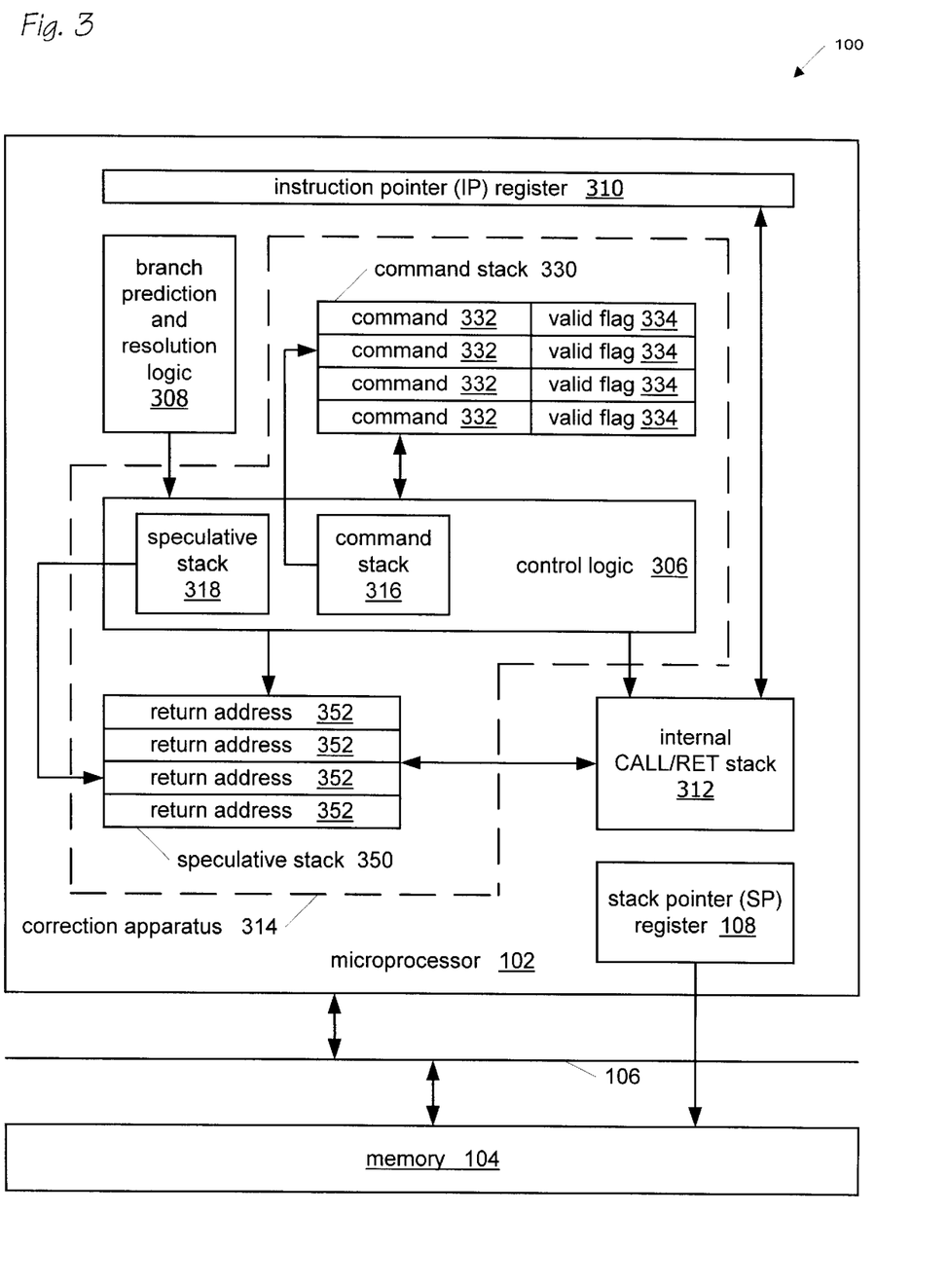
FIG. 3 is a block diagram of portions of the computer system of FIG. 1 and microprocessor of FIG. 2 including an apparatus for correcting an internal call/return stack according to the present invention.

Referring now to FIG. 3, a block diagram of portions of the computer system 100 of FIG. 1 and microprocessor 102 of FIG. 2, including a correction apparatus 314 according to the present invention, is shown. The microprocessor 102 has an instruction pointer (IP) register 310. The IP register 310 maintains the address in main memory 104 of the instruction that is currently being fetched. In one embodiment, the IP register 310 is the IP register of the x86 architecture. The IP register 310 is coupled to an internal call/return stack 312. The internal call/return stack 312 comprises a last-in-first-out memory for storing a plurality of return addresses.

When a CALL instruction is decoded by the Translate stage 204 (of FIG. 2), the return address associated with the CALL instruction is pushed onto the internal call/return stack 312. If the CALL instruction reaches the Write-Back stage 212 (of FIG. 2), the return address is also written to the stack 110 (of FIG. 1) in main memory 104. That is, the microprocessor 102 stores the return address in the stack 110 in memory 104 at the address contained in a stack pointer (SP) register 108.

When a RET instruction is decoded by the Translate stage 204, a return address is popped from the internal call/return stack 312 and stored in the IP register 310. If the RET reaches the Data/ALU stage 210 (of FIG. 2), a return address is also popped from the stack 110 in memory 104. The return address from the stack 110 is compared with the return address popped from the internal call/return stack 312 to verify that the internal call/return stack 312 had the correct value. If the two return addresses do not match, then the pipeline is flushed and restarted using the return address popped from the stack 110 in memory 104.

The microprocessor 102 also comprises branch prediction and resolution logic 308. When a JCC instruction is translated, the branch prediction and resolution logic 308 predicts whether the JCC will be taken. If the branch prediction and resolution logic 308 predicts the JCC will not be taken, then the IP register 310 is updated with the next sequential instruction, i.e., the current value of the IP register 310 plus the length of the JCC instruction. If the branch prediction and resolution logic 308 predicts the JCC will be taken, then the IP register 310 is updated with the target address of the JCC instruction.

The branch prediction and resolution logic 308 also determines if the JCC was incorrectly predicted. If the JCC was incorrectly predicted, then the branch prediction and resolution logic 308 notifies control logic 306 comprised in the correction apparatus 314 that the JCC was mispredicted. In response, the correction apparatus 314 corrects the internal call/return stack 312 as described below.

The correction apparatus 314 is coupled to the internal call/return stack 312 and corrects the internal call/return stack 312 when one or more CALL or RET instructions incorrectly modify the internal call/return stack 312 due to a mispredicted JCC instruction as will be described below. The correction apparatus 314 comprises a speculative stack 350 and a command stack 330 coupled to the control logic 306. The control logic 306 comprises a speculative stack 318 for pointing to the top of the speculative stack 350 and a command stack 316 for pointing to the top of the command stack 330.

The speculative stack 350 comprises a last-in-first out memory for storing return addresses 352 read from the internal call/return stack 312 for use in correcting the internal call/return stack 312 when a RET instruction is incorrectly speculatively executed. The command stack 330 comprises a last-in-first-out memory for storing commands 332 for use in correcting the internal call/return stack 312 when a CALL or RET instruction is incorrectly speculatively executed.

The command stack 330 also has a valid flag 334 associated with each command 332. The valid flag 334 indicates whether the command 332 is valid so that only valid commands are performed to correct the internal call/return stack 312 upon determining that a CALL or RET instruction was incorrectly speculatively executed.

In one embodiment, the command 332 comprises a single bit, wherein one predetermined value of the command 332 indicates a CALL command was speculatively executed and the other predetermined value of the command 332 indicates a RET command was speculatively executed. That is, the first value indicates that the correction apparatus 314 should take steps necessary to correct for a CALL instruction that was incorrectly speculatively executed and the second value indicates that the correction apparatus 314 should take steps necessary to correct for a RET instruction that was incorrectly speculatively executed. The corrective steps are described below.

The speculative stack 350 and the command stack 330 need not reside in two separate physical memories, but rather can be configured such that a single location in memory comprises a command, a valid flag and a return address. In the case of CALL instructions, the return address field is ignored.

Figure 4:
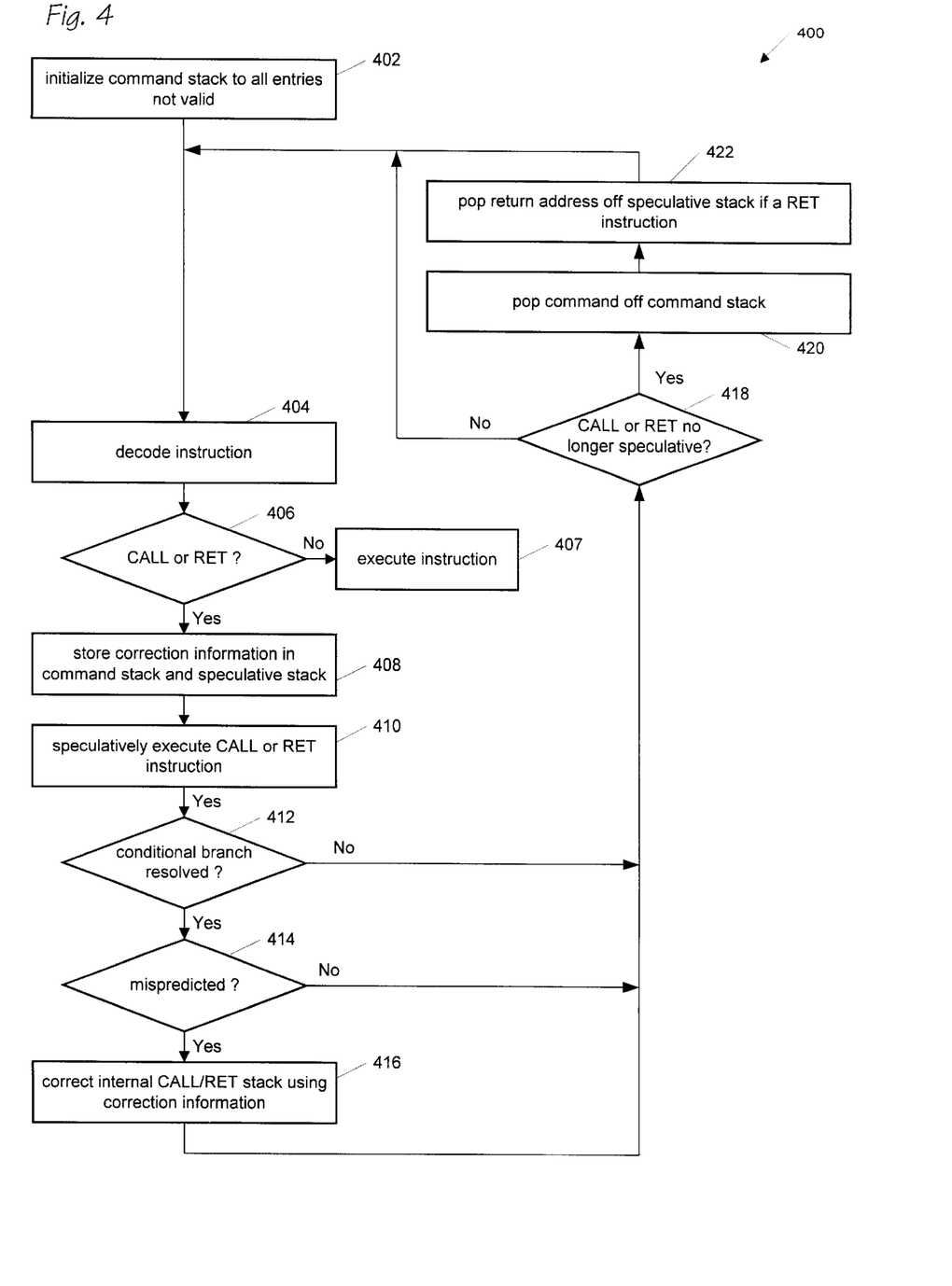
FIGS. 4 through 7 are flow charts illustrating steps executed by the microprocessor of FIG. 3 according to the method of the present invention.

Referring now to FIG. 4, a flow chart illustrating steps executed by the microprocessor 102 of FIG. 3 according to the method of the present invention is shown. Upon initialization of the microprocessor 102, all valid flags 334 in the command stack 330 are cleared, i.e., initialized to indicate that the commands 332 are invalid, in step 402.

After initialization, the microprocessor 102 begins fetching instructions. The microprocessor 102 decodes an instruction, in step 404. The Translate Stage 204 (of FIG. 2) determines if the decoded instruction is a CALL or RET instruction, in step 406. If a CALL or RET instruction is decoded, flow proceeds to block 408. Otherwise, the instruction is executed, at block 407, without utilizing the call/return stack correction mechanism of the present invention.

At block 408, the correction apparatus 314 stores correction information in the command stack 330 and speculative stack 350 to enable correction of the internal call/return stack 312 in the event the CALL or RET instruction was incorrectly speculatively executed, such as due to an incorrectly predicted JCC instruction, in step 408.

Figure 5:
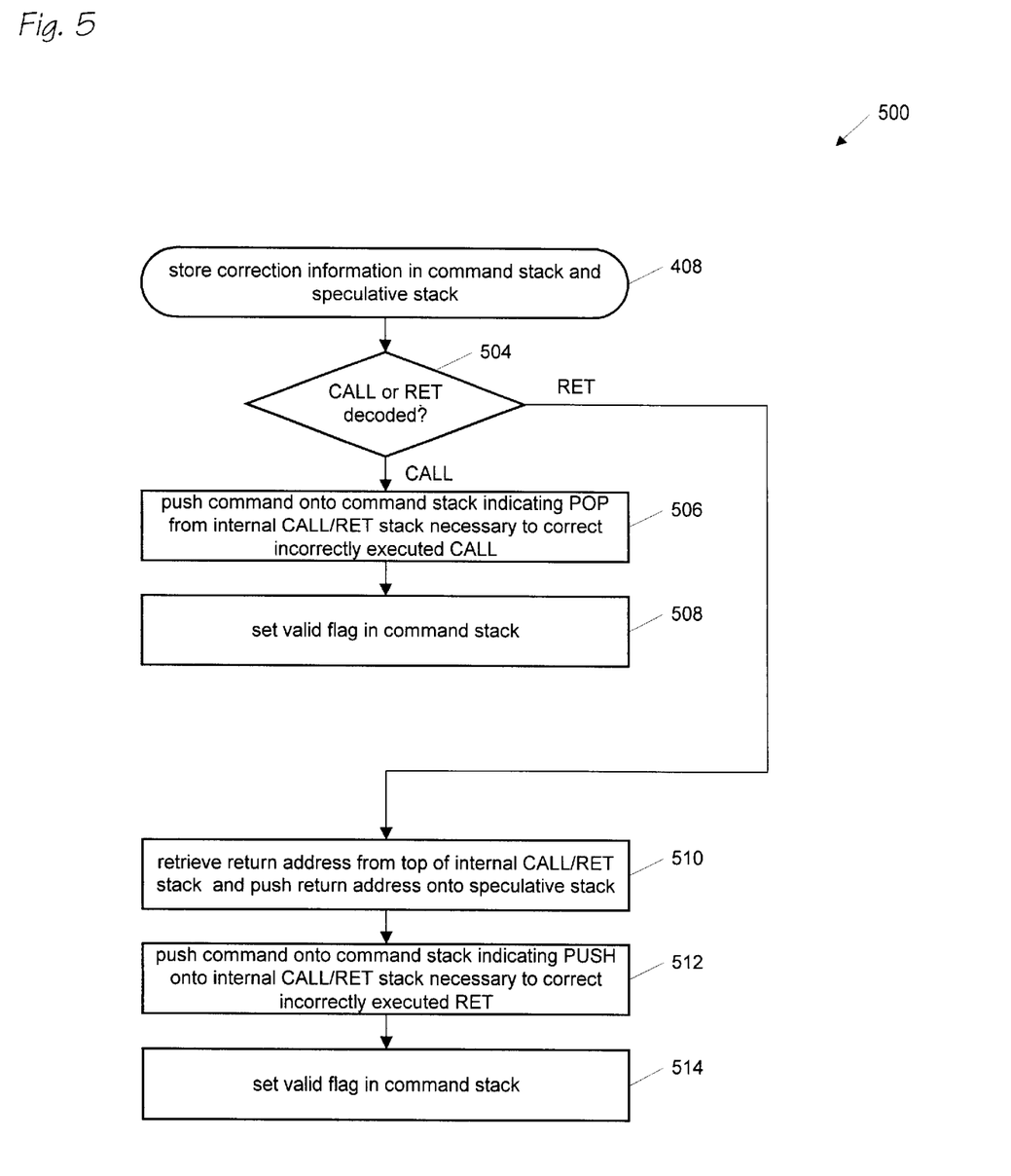

Referring now to FIG. 5, a flowchart illustrating in detail step 408 is shown. First, a determination is made of whether the instruction was a CALL or a RET, in step 504. If the instruction is a CALL instruction, flow proceeds to step 506. If the instruction is a RET instruction, flow proceeds to step 510.

At step 506, the control logic 306 pushes a command onto the command stack 330 indicating that a CALL instruction was executed. The command indicates that a pop of a return address from the internal call/return stack 312 is necessary to correct the effects of execution of the CALL instruction (that will occur later at step 410 described below) if the CALL was incorrectly executed. Flow then proceeds to step 508.

At step 508, the control logic 306 sets the valid flag 334 associated with the command. Preferably, steps 506 and 508 together comprise storing the command in the location pointed to by the command stack 316, setting the valid flag 334 in that location and incrementing the command stack 316.

At step 510, the control logic 306 retrieves a return address at the top of the internal call/return stack 312 and pushes the return address onto the speculative stack 350. The return address is not popped off the internal call/return stack 312. Rather, the return address value is simply read from the internal call/return stack 312. Pushing the return address onto the speculative stack 350 comprises storing the return address in the location pointed to by the speculative stack 318 and incrementing the speculative stack 318. Thus, the return address is saved away in the speculative stack 350 so that the internal call/return stack 312 may be corrected later if necessary, as will be described below. Flow then proceeds to step 512.

At step 512, the control logic 306 pushes a command onto the command stack 330 indicating that a RET instruction was executed. That is, the command indicates that a push of a return address from the speculative stack 350 onto the internal call/return stack 312 is necessary to correct the effects of execution of the RET instruction (that will occur later at step 410 described below) if the RET was incorrectly executed. The commands pushed onto the command stack are predetermined distinct values for the CALL and RET instructions. Flow then proceeds to step 514.

At step 514, the control logic 306 sets the valid flag 334 associated with the command. Preferably, steps 512 and 514 together comprise storing the command in the location pointed to by the command stack 316, setting the valid flag 334 in that location and incrementing the command stack 316. This completes step 408.

Returning now to FIG. 4, once the correction apparatus 314 stores the correction information at step 408, flow proceeds to step 410.

At step 410, the microprocessor 102 executes the CALL or RET instruction. The execution of the CALL or RET instruction is speculative if the CALL or RET is executed before the outcome of a prior JCC instruction is resolved since the CALL or RET may never be fully executed if the JCC was incorrectly predicted. In step 410, the CALL or RET instruction is not fully executed. Instead, the CALL or RET instruction may proceed as far down the pipeline of the microprocessor 102 as possible until a stage where the outcome of any preceding JCC instruction must be resolved before the CALL or RET instruction may be fully executed. Step 410 is particularly illustrated by the flow chart 600 in FIG. 6, to which attention is now directed.

Figure 6:
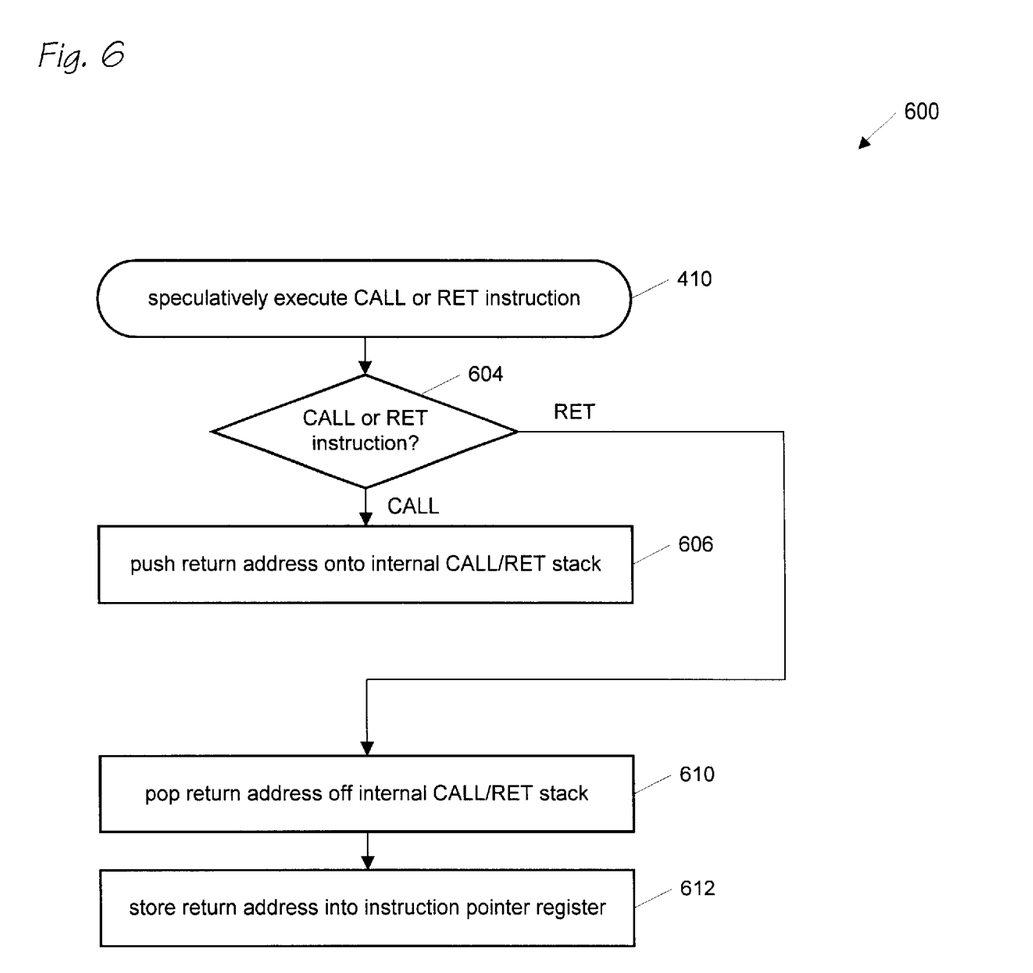

Flow, in FIG. 6 begins at step 410 and proceeds to decision step 604.

At decision step 604, a determination is made of whether the instruction was a CALL or a RET. If the instruction is a CALL instruction, flow proceeds to step 606. If the instruction is a RET instruction, flow proceeds to step 610.

At step 606, the control logic 306 pushes the return address of the CALL instruction onto the internal call/return stack 312. This return address stored in the internal call/return stack 312 may later be used when the next RET instruction is executed to save time by not having to wait for the return address to be fetched from the stack 110 main memory 104. As mentioned above, the microprocessor 102 also pushes the return address onto the stack 110 in memory 104 if the CALL instruction ends up being fully executed, in particular, if no prior conditional branch instructions were previously mispredicted.

At step 610, the control logic 306 pops a return address off the internal call/return stack 312. Flow then proceeds to step 612.

At step 612, the control logic 306 stores the return address popped off the internal call/return stack 312 into the IP register 310. As mentioned above, the microprocessor 102 also pops the return address from the stack 110 in memory 104 and compares it with the value popped from the internal call/return stack 312 if the RET instruction ends up being fully executed, in particular, if no prior conditional branch instructions were previously mispredicted. At this point, step 410 of FIG. 4 completes.

Returning again to FIG. 4, upon completion of step 410, flow proceeds to decision step 412.

At decision step 412, the microprocessor 102 determines whether a JCC instruction has been resolved. The resolution of the JCC instruction occurs in the Data/ALU stage 210 (of FIG. 2). If a JCC has been resolved, flow proceeds to decision step 414. Otherwise, flow proceeds to decision step 418.

At decision step 414, the microprocessor 102 determines whether the JCC has been mis-predicted. If the JCC has been mispredicted, flow proceeds to step 416. Otherwise, flow proceeds to decision step 418.

At step 416, the correction apparatus 314 corrects the internal call/return stack 312 using correction information stored in the command stack 330 and speculative stack 350 during step 408. This process is particularly illustrated in flow chart 700 of FIG. 7, to which attention is now directed.

Figure 7:
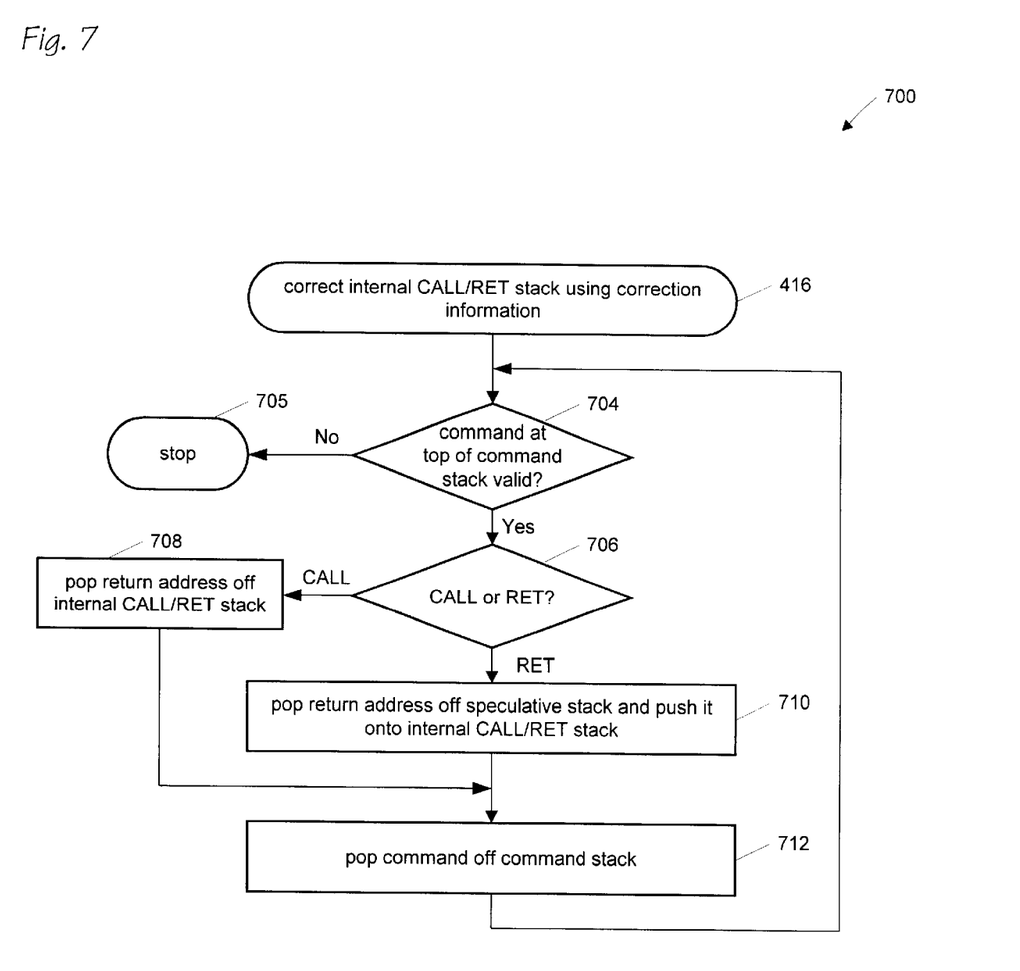

Flow begins at step 416 and proceeds to decision step 704. At step 704, the valid flag 334 at the top of the command stack 330 is examined to determine if the associated command 332 at the top of the command stack 330 is valid. If the command 332 is valid, flow proceeds to decision step 706. Otherwise, flow proceeds to step 705 where step 416 completes.

At decision step 706, the control logic 306 examines the command 332 to determine which correction command to execute. That is, the control logic 306 examines the value in the command 332 to determine if a CALL or RET had been previously speculatively executed incorrectly. If the command 332 indicates a CALL was executed, flow proceeds to step 708. If the command 332 indicates a RET was executed, flow proceeds to step 710.

At step 708, the control logic 306 pops a return address off the internal call/return stack 312 to correct the internal call/return stack 312. That is, a return address had been incorrectly pushed onto the internal call/return stack 312 previously in step 606 and is restored by step 708 to its correct state. Flow then proceeds to step 712.

At step 710, the control logic 306 pops a return address off the speculative stack 350 and pushes the return address onto the internal call/return stack 312 to correct the internal call/return stack 312. That is, the return address had been incorrectly popped off the internal call/return stack 312 previously in step 610 and is restored by step 710 to its correct state. Popping a return address off the speculative stack 350 comprises retrieving the return address 352 at the speculative stack 318 and decrementing the speculative stack 318. Flow then proceeds to step 712.

At step 712, after the control logic 306 corrects the internal call/return stack 312 by step 708 or 710, the control logic 306 pops a command 332 off the command stack 330. Popping a command off the command stack comprises clearing the valid flag 334 in the location pointed to by the command stack 316 and decrementing the command stack 316.

The control logic 306 continues to execute steps 704 through 712 as long as valid commands 332 are present in the command stack 330. Advantageously, the command stack 330 and speculative stack 350 are more than one location deep and are last-in-first-out structures. The last-in-first-out nature of the command stack 330 and speculative stack 350 ensure that the internal call/return stack is corrected in the reverse order of which it was incorrectly modified. These features of the invention enable correction of the internal call/return stack 312 even if multiple CALL or RET instructions have been speculatively executed prior to resolution of the JCC.

In one embodiment, as shown in FIG. 3, the command stack 330 and speculative stack 350 each comprise four locations. That is, up to four CALL or RET instructions may be speculatively executed before a conditional branch instruction is resolved and determined to be incorrectly predicted and the internal call/return stack 312 can still be corrected by the particular embodiment of the present invention.

Returning back to FIG. 4, upon completion of step 416, flow proceeds to decision step 418.

At decision step 418, the microprocessor 102 determines whether a CALL or RET instruction is no longer speculative. In one embodiment, a CALL or RET instruction is no longer speculative if it has reached the Data/ALU stage 210. That is, if the CALL or RET instruction has reached this stage, then any JCC instructions that may have preceded the CALL or RET instruction have already been resolved and determined to have been accurately predicted. Because the microprocessor 102 is a pipelined microprocessor, step 418 is performed substantially in parallel with steps 404 through 416.

If a CALL or RET instruction is no longer speculative, flow proceeds to step 420. Otherwise, flow proceeds back to step 404.

At step 420, the correction apparatus 314 pops a command 332 off the command stack 330. The command 332 at the top of the command stack 330, i.e., the command 332 associated with the CALL or RET now determined to be non-speculative, is no longer needed since no correction of the internal call/return stack 312 will be performed with respect to the non-speculative CALL or RET. Flow then proceeds to step 422.

At step 422, a return address 334 is popped off the speculative stack 350 because it also is no longer needed for the same reason. Flow then proceeds back to step 404 where a next instruction is decoded. This completes the steps shown in flow chart 400.

Various implementations of memory stacks are well known in the art. It is noted that the implementation described is a post-decrementing/incrementing stack. However, in another embodiment any or all of the stacks may be pre-decrementing/incrementing stacks. Furthermore, embodiments are contemplated in which the stacks grow down rather than up.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. An apparatus for correcting an internal call/return stack in a microprocessor that speculatively executes call and return instructions, the apparatus comprising:

first and second memories; and control logic coupled to the internal call/return stack and to said first and second memories configured to store correction information into said first and second memories in response to a decode of one or more call or return instructions and to correct the internal call/return stack from said correction information in response to a determination that said one or more call or return instructions was speculatively executed incorrectly.

2. The apparatus of claim 1, wherein said control logic is configured to store in said first memory a command for correcting the internal call/return stack in response to said decode of each of said one or more call or return instructions.

3. The apparatus of claim 2, wherein said command comprises a first predetermined value if said call or return instruction is a call instruction and a second predetermined value if said call or return instruction is a return instruction.

4. The apparatus of claim 3, wherein said control logic is further configured retrieve a return address from the internal call/return stack and to store in said second memory said return address in response to said decode of each of said one or more call or return instructions which is a return instruction.

5. The apparatus of claim 4, wherein said first memory comprises a stack, wherein said control logic is configured to push said command onto said first memory stack in response to said decode of said one or more call or return instructions.

6. The apparatus of claim 5, wherein said second memory comprises a stack, wherein said control logic is configured to retrieve said return address from the internal call/return stack and push said return address onto said second memory stack in response to said decode of each of said one or more call or return instructions which is a return instruction.

7. The apparatus of claim 5, wherein said control logic is further configured to pop said command from said first memory stack upon a determination that one of said one or more call or return instructions is no longer speculative.

8. The apparatus of claim 7, wherein said control logic is further configured to pop said return address from said second memory stack upon a determination that one of said one or more call or return instructions which is a return instruction is no longer speculative.

9. The apparatus of claim 6, wherein said control logic is further configured to pop said return address from the internal call/return stack for each command in said first memory stack having said first predetermined value upon said determination that said one or more call or return instructions was speculatively executed incorrectly.

10. The apparatus of claim 9, wherein said control logic is further configured to pop said command from said first memory stack after said popping said return address from the internal call/return stack.

11. The apparatus of claim 9, wherein said control logic is further configured to pop said return address from said second memory stack and to push said return address from said second memory stack onto the internal call/return stack for each command in said first memory stack having said second predetermined value upon said determination that said one or more call or return instructions was speculatively executed incorrectly.

12. The apparatus of claim 11, wherein said control logic is further configured to pop said command from said first memory stack after said popping said return address from said second memory stack and said pushing said return address from said second memory stack onto the internal call/return stack.

13. A method for correcting an internal call/return stack in a microprocessor that speculatively executes call and return instructions, the method comprising:

decoding a call or return instruction;

storing correction information into first and second memories in response to said decoding;

speculatively executing said call or return instruction after said storing;

determining if said call or return instruction was speculatively executed incorrectly; and correcting the internal call/return stack from said correction information if said call or return instruction was speculatively executed incorrectly.

14. The method of claim 13, wherein said storing correction information comprises storing in said first memory a command for correcting the internal call/return stack.

15. The method of claim 13, wherein said determining if said call or return instruction was speculatively executed incorrectly comprises determining if a conditional branch instruction decoded prior to said decoding said call or return instruction was incorrectly predicted.

16. The method of claim 14, wherein said command comprises a first predetermined value if said call or return instruction is a call instruction and a second predetermined value if said call or return instruction is a return instruction.

17. The method of claim 16, wherein said storing correction information further comprises retrieving a return address from the internal call/return stack and storing in said second memory said return address if said call or return instruction is a return instruction.

18. The method of claim 17, wherein said first memory comprises a stack, wherein said storing correction information comprises pushing said command onto said first memory stack.

19. The method of claim 18, wherein said second memory comprises a stack, wherein said storing correction information comprises retrieving said return address from the internal call/return stack and pushing said return address onto said second memory stack.

20. The method of claim 18, further comprising popping said command from said first memory stack upon determining said call or return instruction is no longer speculative.

21. The method of claim 20, further comprising popping said return address from said second memory stack upon determining said call or return instruction which is a return instruction is no longer speculative.

22. The method of claim 19, wherein said correcting the internal call/return stack comprises popping said return address from the internal call/return stack for each command in said first memory stack having said first predetermined value.

23. The method of claim 22, further comprising popping said command from said first memory stack after said popping said return address from the internal call/return stack.

24. The method of claim 22, wherein said correcting the internal call/return stack comprises popping said return address from said second memory stack and pushing said return address from said second memory stack onto the internal call/return stack for each command in said first memory stack having said second predetermined value.

25. The method of claim 23, further comprising popping said command from said first memory stack after said popping said return address from said second memory stack and pushing said return address from said second memory stack onto the internal call/return stack.

26. A microprocessor that speculatively executes call and return instructions, comprising:

an internal call/return stack;

first and second memories; and control logic coupled to the internal call/return stack and to said first and second memories configured to store correction information into said first and second memories in response to a decode of one or more call or return instructions and to correct the internal call/return stack from said correction information in response to a determination that said one or more call or return instructions was speculatively executed incorrectly.

27. The microprocessor of claim 26, wherein said control logic is configured to store in said first memory a command for correcting the internal call/return stack in response to said decode of each of said one or more call or return instructions.

28. The microprocessor of claim 26, further comprising branch prediction logic coupled to said control logic configured to provide to said control logic an indication that a conditional branch instruction has been incorrectly predicted, wherein said control logic is configured to correct the internal call/return stack from said correction information in response to said indication that said conditional branch instruction has been incorrectly predicted.

29. The microprocessor of claim 27, wherein said command comprises a first predetermined value if said call or return instruction is a call instruction and a second predetermined value if said call or return instruction is a return instruction.

30. The microprocessor of claim 29, wherein said control logic is further configured retrieve a return address from the internal call/return stack and to store in said second memory said return address in response to said decode of each of said one or more call or return instructions which is a return instruction.

31. The microprocessor of claim 30, wherein said first memory comprises a stack, wherein said control logic is configured to push said command onto said first memory stack in response to said decode of said one or more call or return instructions.

32. The microprocessor of claim 30, wherein said control logic is further configured to pop said command from said first memory stack upon a determination that one of said one or more call or return instructions is no longer speculative.

33. The microprocessor of claim 32, wherein said control logic is further configured to pop said return address from said second memory stack upon a determination that one of said one or more call or return instructions which is a return instruction is no longer speculative.

34. The microprocessor of claim 31, wherein said second memory comprises a stack, wherein said control logic is configured to retrieve said return address from the internal call/return stack and push said return address onto said second memory stack in response to said decode of each of said one or more call or return instructions which is a return instruction.

35. The microprocessor of claim 34, wherein said control logic is further configured to pop said return address from the internal call/return stack for each command in said first memory stack having said first predetermined value upon said determination that said one or more call or return instructions was speculatively executed incorrectly.

36. The microprocessor of claim 35, wherein said control logic is further configured to pop said command from said first memory stack after popping said return address from the internal call/return stack.

37. The microprocessor of claim 35, wherein said control logic is further configured to pop said return address from said second memory stack and to push said return address from said second memory stack onto the internal call/return stack for each command in said first memory stack having said second predetermined value upon said determination that said one or more call or return instructions was speculatively executed incorrectly.

38. The microprocessor of claim 37, wherein said control logic is further configured to pop said command from said first memory stack after said popping said return address from said second memory stack and said pushing said return address from said second memory stack onto the internal call/return stack.

* * * * *